United States Patent [19]

Blotekjaer

[11] Patent Number: 4,750,795
[45] Date of Patent: Jun. 14, 1988

[54] OPTICAL FIBER COUPLER

[75] Inventor: Kjell Blotekjaer, Trondheim, Norway

[73] Assignee: The Board of Trustees of the Leland Stanford Junior University, Stanford, Calif.

[21] Appl. No.: 744,502

[22] Filed: Jun. 13, 1985

[51] Int. Cl.$^4$ .............................................. G02B 6/26
[52] U.S. Cl. ................................ 350/96.15; 350/96.29; 350/96.10
[58] Field of Search .............. 350/96.15, 96.16, 96.18, 350/96.29; 455/612

[56] References Cited

U.S. PATENT DOCUMENTS

| | | | |
|---|---|---|---|
| 4,149,770 | 4/1979 | Milton et al. | 350/96.16 X |
| 4,234,969 | 11/1980 | Singh | 350/96.16 |
| 4,301,543 | 11/1981 | Palmer | 455/612 |
| 4,307,933 | 12/1981 | Palmer et al. | 350/96.16 |
| 4,325,605 | 4/1982 | Winzer et al. | 350/96.15 |
| 4,339,170 | 7/1982 | Winzer | 350/96.16 |
| 4,358,851 | 11/1982 | Scifres et al. | 350/96.15 |
| 4,378,143 | 3/1983 | Winzer | 350/96.15 |
| 4,575,180 | 3/1986 | Chang | 350/96.15 X |
| 4,590,619 | 5/1986 | Winzer | 455/612 |
| 4,600,267 | 7/1986 | Yamasaki et al. | 350/96.15 |
| 4,618,211 | 9/1986 | Fleury | 350/96.15 |
| 4,637,682 | 1/1987 | Mahlein et al. | 350/96.15 |
| 4,669,817 | 5/1987 | Mori | 350/96.15 |

FOREIGN PATENT DOCUMENTS 8110947 12/1982 France .

OTHER PUBLICATIONS

Wood, et al., "Demonstration of Effectively Non-reciprocal Optical Fiber Directional Coupler", Conference on Optical Fiber Communication, San Diego, Feb. 11-13, 1985, Post-Deadline Paper No. PD14.
H. Kuwahara, et al., "A Semi-Transparent Mirror-Type Directional Coupler for Optical Fiber Applications", IEEE Transactions on Microwave Theory and Techniques, Jan. 1975.

Primary Examiner—William L. Sikes
Assistant Examiner—Akm E. Ullah
Attorney, Agent, or Firm—Knobbe, Martens, Olson & Bear

[57] ABSTRACT

A fiber optic coupler comprises a multimode fiber bus, an input branch fiber, and an output branch fiber. Coupling between the fibers is accomplished by means of a reflector, disposed in the core of the multimode optical fiber. The reflector is quite small, such that only a small fraction of the light propagating in the multimode fiber is incident thereon. The incident light is reflected towards the output branch fiber and coupled thereto through a lens. Light propagating in the input branch fiber towards the multimode fiber is focused on the reflector by means of a lens. The reflector is oriented to reflect the focused light in a generally cone-shaped beam directed longitudinally down the axis of a multimode fiber. Preferably, the cone-shaped beam diverges so that substantially all the modes within the acceptance cone of the multimode fiber are excited. Such excitation of the modes is preferably equalized by selecting the numerical aperture of the multimode fiber such that only the portion of the reflected beam which has a relatively uniform intensity is within the acceptance cone of the fiber. The invention is particularly advantageous for local area networks and distributed sensor systems.

9 Claims, 4 Drawing Sheets

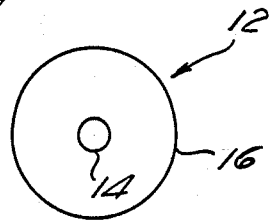
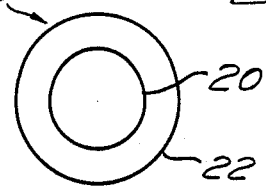
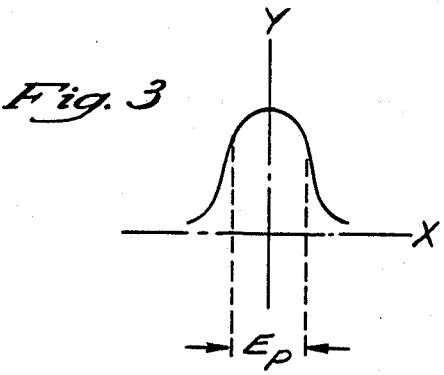
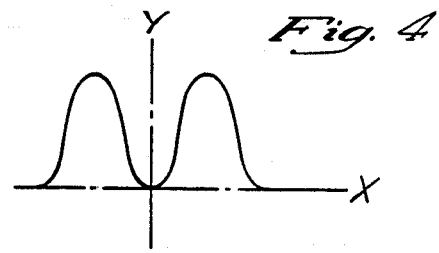
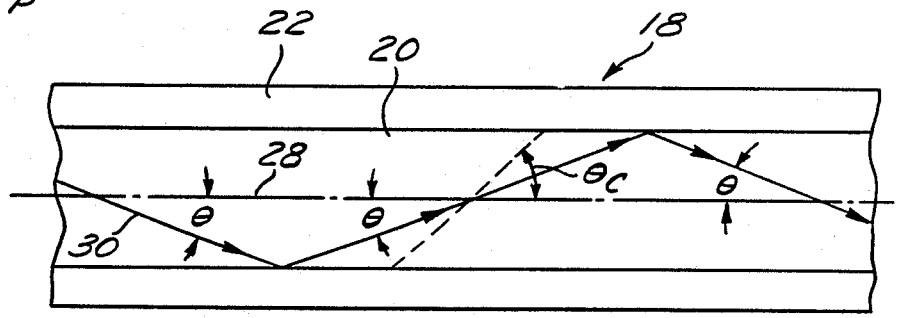
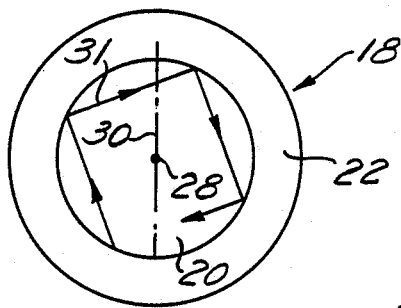
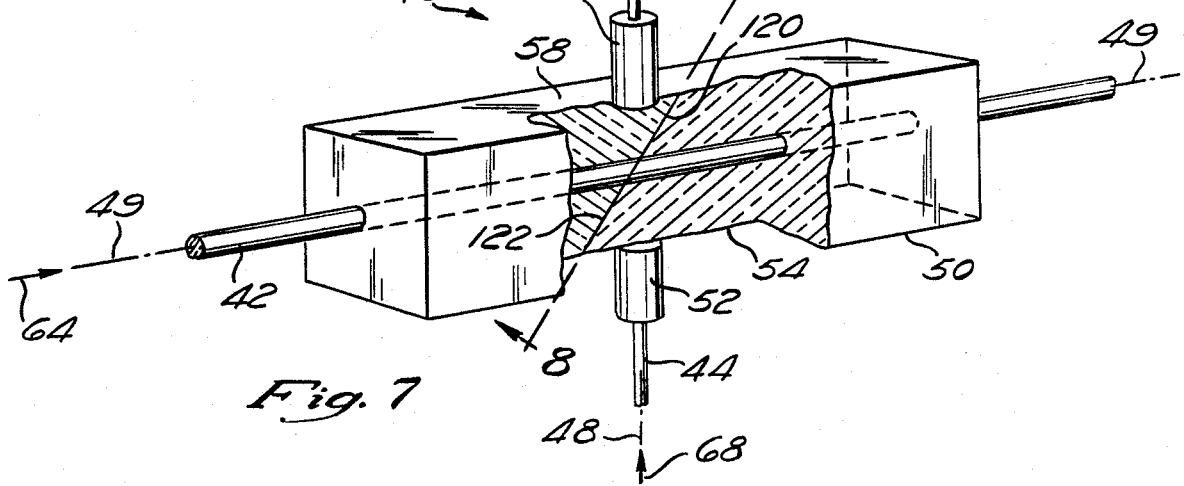

OPTICAL FIBER COUPLER

BACKGROUND OF THE INVENTION

The present invention relates generally to fiber optic couplers, and more specifically to single mode to multimode fiber optic directional couplers.

Fiber optic directional couplers are used in communication networks, optical signal processing, and sensor systems. For example, fiber optic local area networks (LANs) utilize fiber optic couplers to coupler light between a fiber bus and plural work stations, each of which comprises an optical transmitter and receiver.

Most prior art directional couplers are "reciprocal" devices, that is, they inherently couple the same fraction of optical power regardless of whether the coupling is from a first fiber to a second fiber or from the second fiber to the first fiber. Non-reciprocal coupling devices, on the other hand, couple significantly different fractions of optical power between fibers. Such non-reciprocal coupling devices are more advantageous than reciprocal coupling devices for many applications, such as local area networks. For example, in a local area network, it is desirable to couple only a small fraction of the data signal optical power from the bus to each station, so as to permit the bus to accomodate a large number of stations. On the other hand, it is desirable that substantially all of the data signal optical power generated at each station be coupled to the data bus. Since reciprocal couplers couple the same amount of optical power in both directions (i.e., bus to station or station to bus), the use of such reciprocal couplers in local area networks severely limits the maximum number of stations. Similar problems exist in other fiber optic applications, such as multiplexed sensor networks.

The foregoing problems have been addressed in the prior art by utilizing a nonreciprocal, single mode to multimode fiber optic directional coupler. The multimode fiber serves as a data bus, while the single mode fiber serves as a network branch, e.g. for a work station. Optical data generated at the work station is transmitted through the single mode fiber for coupling to the multimode fiber bus. The prior art couplers are typically formed by removing a portion of the cladding from the side of a single mode fiber and a multimode fiber, and then juxtaposing the portions of the fibers where the cladding has been removed, so that the fibers are in side by side relationship. However, to ensure effective coupling between the single mode and multimode fiber, the coupled modes must be phase matched so that they have approximately the same phase velocity. Since the modes of a multimode fiber have phase velocities spread over a substantial range, only a limited number of higher order modes within the multimode fiber are utilized. The resulting mode distribution in the multimode fiber is, therefore, not uniform, and is likely to be influenced by microbends or other fiber perturbations. Accordingly, the coupling coefficient of such a coupler may be influenced by the environment.

SUMMARY OF THE INVENTION

The present invention comprises a directional coupler having first and second optical fibers. The preferred embodiment of the invention also includes a third optical fiber. Preferably, the first optical fiber is a single mode optical fiber. The second optical fiber is a multimode optical fiber having plural mode groups. In the embodiment disclosed, the second fiber serves as an optical bus, while the first and third fibers provide input and output branches for coupling light to and from the second fiber. Advantageously, the coupler of the present invention does not require any phase matching of the modes in the fibers.

Coupling between the fibers is accomplished by means of a reflector, disposed in the core of the multimode optical fiber. The reflector is sized and oriented such that only a small fraction of the light propagating in the multimode fiber is incident thereon. In the preferred embodiment, the reflector is disposed at the center of the fiber core. The light incident on the reflector is reflected towards the output branch fiber and coupled thereto, for example, through a graded index lens. Because the reflector is sized and oriented to intercept only a fraction of the light propagating in the multimode fiber, a large number of couplers can be located on a single fiber bus without substantially degrading the throughput of the bus.

Light propagating in the input branch fiber towards the multimode fiber is focused on the reflector, for example, by means of the graded index lens. The reflector is oriented to reflect this focused light in a generally cone-shaped beam directed longitudinally down the axis of the multimode fiber. The cone-shaped beam diverges such that substantially all of the modes within the acceptance cone of the multimode fiber are excited. Preferably, the light is distributed among the mode groups, such that the optical power in each mode group is proportional to the number of modes in the mode group. This is accomplished by equalizing the intensity of the cone shaped beam throughout the area defined by the acceptance cone of the multimode fiber. The intensity may be equalized by selecting the numerical aperture of the multimode fiber such that only that portion of the reflected beam which has relatively uniform intensity, referred to as the "constant intensity beam portion" is within the acceptance cone of the fiber. The size of the constant intensity beam portion may be increased by sizing the reflector relative to the beam incident thereon such that only the portion of the light from the input branch fiber which is within the peak of the approximately Gaussian-shaped energy distribution is reflected.

DESCRIPTION OF THE DRAWINGS

These and other features of the present invention are best understood through reference to the drawings in which:

FIG. 1 is a schematic drawing illustrating the cross section of a typical single mode optical fiber;

FIG. 2 is a schematic drawing illustrating the cross section of a typical multi-mode optical fiber;

FIG. 3 is a graph showing the energy distribution pattern for the first order mode of an optical fiber;

FIG. 4 is a graph showing the energy distribution pattern for the second order mode of an optical fiber;

FIG. 5 is a schematic drawing illustrating a light ray being guided within the core of a step index multimode optical fiber, and further illustrating the maximum total reflection complimentary angle, beyond which light rays will cease to be guided by the optical fiber;

FIG. 6 is a schematic drawing illustrating a meridional ray and a skew ray propagating down the optical fiber of FIG. 5;

FIG. 7 is a perspective view of a preferred embodiment of the coupler of the present invention;

DETAILED DESCRIPTION OF THE PREFERRED EMBODIMENT

Figure 9:
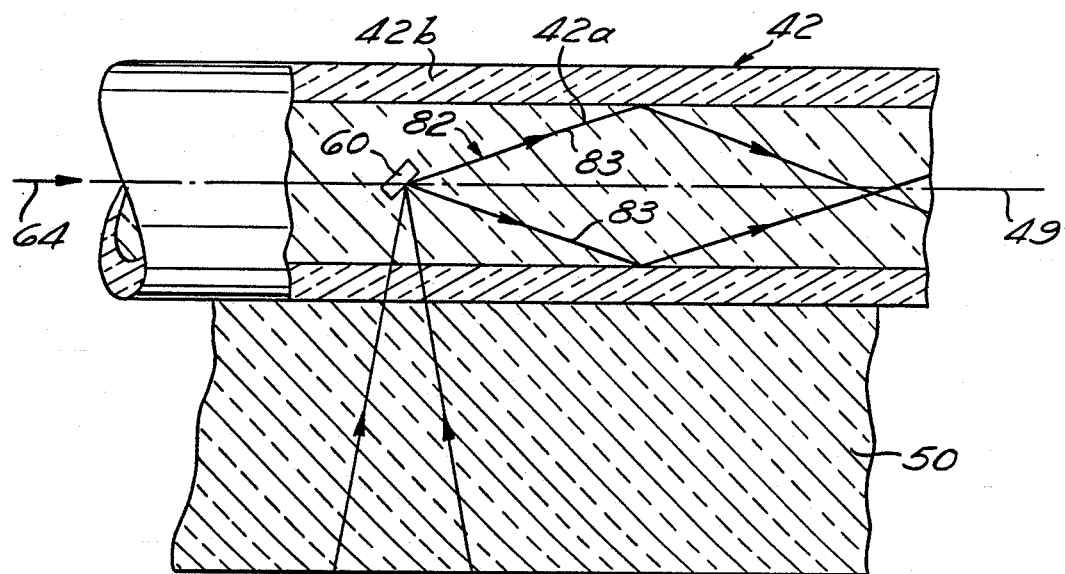
FIG. 9 is a partial cross sectional view of the coupler of FIG. 7, illustrating the function of the mirror in optically coupling light from the input branch fiber to the multi-mode bus fiber.

A basic understanding of mode theory of optical fibers is helpful in order to fully appreciate the inventive concepts underlying the coupler of the present invention. Accordingly, before discussing the structural and functional aspects of the present invention, a brief discussion of mode theory will be presented.

Optical fibers may be broadly classified into two groups, namely, single mode optical fibers and multi-mode optical fibers. As their names imply, single mode fibers propagate light in only a single mode, while multimode fibers propagate light in multiple modes. In general, a mode may be defined as an optical path in the fiber through which light propagates unchanged, except for phase. Thus, a single mode fiber may be viewed as having a single optical path therethrough, while a multimode fiber may be viewed as having plural independent optical paths therethrough.

The number of modes which may be supported by an optical fiber is dependent upon the geometry of the fiber, particularly the core radius. A typical single mode fiber is illustrated in FIG. 1, while a typical multimode fiber is illustrated in FIG. 2. The single mode fiber 12 has an inner core 14, surrounded by an outer cladding 16. Similarly, the multimode fiber 18 includes an inner core 20, surrounded by an outer cladding 22. As illustrated, the single mode core 14 is smaller than the multimode core 20. In general, the number of modes supported by the fiber is a function of the core radius, the refractive indices of the core and the cladding, and the wavelength of the light propagating through the fiber. Furthermore, the exact profile of the refractive index across the core influences the number of modes supported. Typically, single mode fibers have a core radius on the order of 5 to 10 microns, while multimode fibers typically have a core radius on the order to 50 to 100 microns.

Each fiber mode has a cross-sectional energy distribution which is unique relative to the other modes. For example, the energy distribution for the first order, or fundamental, mode is shown in FIG. 3. The Y axis in FIG. 3 represents optical energy, while the X axis represents distance from the center of the fiber core. As illustrated, the energy distribution of the fundamental mode is approximately Gaussian shaped, such that most of the optical energy is concentrated at the center of the fiber. The geometry of a single mode fiber is such that only this first order or fundamental mode will propagate therein. However, as the core radius increases, other parameters being constant, the fiber will begin to support additional modes, e.g. second order, third order, fourth order, etc. The energy distribution for the second order mode is shown in FIG. 4. As illustrated, the optical energy in the second order mode is distributed in two lobes, both of which are displaced from the center of the fiber core. In general, the energy distribution tends to be displaced further from the center of the fiber core as the order of the mode (i.e. mode number) increases. Thus, light in the lower order modes tends to propagate closer to the center of the fiber core than the higher order modes.

Each of the above described modes (e.g., first order, second order, third order, etc.) tends to propagate light at a different velocity. As is well known, imperfections and perturbations of the fiber will tend to couple light between the modes. Such coupling increases with decreasing difference in phase velocity between the modes. The propagation velocities of the above described modes are sufficiently dissimilar that these modes are substantially uncoupled. Thus, light launched in a particular mode tends to remain in that mode for long distances (e.g., on the order of kilometers for presently availabe fibers).

Those skilled in the art will understand that each of the above discussed modes consists of a group of closely related modes. For example, the first order mode may be subdivided into a group of two modes which comprise polarization modes. The second order mode may be subdivided into a group of four modes. It is important to understand that all of the modes within a particular group of modes have approximately the same phase velocity, while each of the mode groups differ in phase velocity with respect to the other mode groups. In general, the number of modes in each mode group increases with the order of the mode (i.e., mode number). Thus, the second order mode includes a mode group having more modes than the mode group of the first order mode, the third order mode includes a mode group having more modes than the mode group of the second order mode, etc. For purposes of reference hereinafter, the term "mode group" will be used to refer to a group of modes having approximately the same phase velocity, while the term "mode" will be used in a general sense as referring to any mode which propagates in the fiber.

Because the modes within a mode group have approximately the same phase velocity, light tends to readily couple between the modes within a mode group. This coupling is caused by slight intrinsic imperfections present in all presently available optical fibers. It is generally assumed that there are enough intrinsic imperfections in presently available optical fibers to cause an even distribution of power among the modes in a group after propagating only a relatively short distance along the fiber. Thus, light coupled to only a single mode within a mode group will quickly couple to the other modes within that group.

The foregoing discussion of fiber modes was presented primarily in terms of field theory. Those skilled in the art will recognize that modes and mode groups may be alternatively described in terms of a different theory, called "ray theory". Under ray theory, the light propagating in any mode may be represented by a set of light rays. Referring to FIG. 5, the first order or fundamental mode is represented by a ray (not shown) which is coincident with the longitudinal axis 28 of the multimode fiber core 20. Each of the higher order modes is represented by a set of rays, which is inclined at an angle relative to the longitudinal axis 28 of the fiber core 20. In general, the higher the mode group number, the greater the angle between the set of rays and the longitudinal axis 28 of the core. For example, the ray 30 of FIG. 5 represents one of the rays within a high order mode which, for purposes of discussion, will be assumed to be a mode within the tenth order mode group of a multimode fiber having 15 mode groups. As illustrated, the ray 30 intercepts the longitudinal axis of the fiber 18 at an angle $\theta$. The sets of rays (not shown) representing mode Groups 11–15 would thus be inclined from the longitudinal axis 28 at angles greater than $\theta$, while the sets of rays (not shown) representing mode Groups 1–9 would be inclined from the longitudinal axis 28 at angles less than $\theta$.

From FIG. 5, it may be seen that the ray 30 is totally internally reflected each time it reaches the interface between the core 20 and cladding 22, such that the ray 30 is guided down the length of the fiber 18. Such internal reflection occurs for all of the modes which are supported by the fiber 18, except the fundamental mode which requires no reflection to be guided within the fiber core, since it propagates along the axis 28.

As shown in FIG. 6, the ray 30 discussed in reference to FIG. 5 propagates down the fiber 18 in a plane which passes through the fiber axis 28 and extends from the core/cladding interface on one side of the fiber to the core/cladding interface on the other side of the fiber. For purposes of reference hereinafter, such a ray which passes through the central longitudinal axis of the core 20 as it propagates down the fiber 18 will be referred to as "meridional ray". In addition to meridional rays, each mode group also includes rays, such as the ray 31 in FIG. 6, which will be referred to as "skew" rays. Skew rays are distinguished from meridional rays in that they do not pass through the longitudinal axis of the core during propagation. However, all of the modes within a particular mode group, whether skew or meridional, are inclined relative to the central longitudinal axis of the core by substantially the same angle. Thus, since the exemplary rays 30 and 31 are within the same mode group, both of the rays, 30, 31 will be inclined relative to the central longitudinal axis at the angle $\theta$. In general, the number of skew rays associated with a particular meridional ray increases as the angle $\theta$ increases. Thus, there are ordinarily more skew rays associated with higher order modes than with lower order modes.

Those skilled in the art will recognize that the angle between a particular ray and the central longitudinal axis 28 of the core (e.g., the angle $\theta$ for the ray 30) defines the propagation velocity of the mode represented by the ray. Accordingly, since all of the rays which comprise a particular mode group are inclined by substantially the same angle relative to the longitudinal axis (e.g. the angle $\theta$ in FIG. 5), all of the modes within that mode group will propagate light at substantially the same velocity. Conversely, the modes associated with rays which are inclined from the longitudinal axis 28 at substantially different angles will propagate light at substantially different velocities, and will be in different mode groups.

As it is well known, in a step index optical fiber, the rays are reflected at the core/cladding interface by virtue of the fact that the cladding of an optical fiber has a refractive index which is lower than the refractive index of the core. The number of rays that will be guided by the fiber is a function of the ratio of the refractive index of the core to the refractive index of the cladding. Rays inclined from the axis 28 at an angle greater than or equal to $\theta_c$ (FIG. 5), referred to herein as the "total reflection complementary angle", will not be reflected, but will instead radiate through the cladding and out of the fiber. This angle $\theta_c$ is defined in terms of the refractive index difference between the core and the cladding as follows:

$$\theta_c = \cos^{-1}\left(\frac{n_2}{n_1}\right) \tag{1}$$

where $n_1$ is the refractive index of the core and $n_2$ is the refractive index of the cladding. Those skilled in the art will understand that the angle $\theta_c$ is closely related to the numerical aperture of the fiber.

In a step index fiber having a core of radius a, the number of rays (M) which are inclined from the axis (28) at an angle less than $\theta_c$ (and thus, the number of modes (M) supported by the fiber) may be calculated as follows:

$$M \approx \frac{V^2}{2} \tag{2}$$

where:

$$V = k_o a \sqrt{n_1^2 - n_2^2} \tag{3}$$

and:

$$k_o = \frac{2\pi}{\lambda} \tag{4}$$

where $\lambda$ is the wavelength of the light in a vacuum.

It should be noted that the quantity (M) defines the total number of modes in all of the mode groups.

Figure 8:
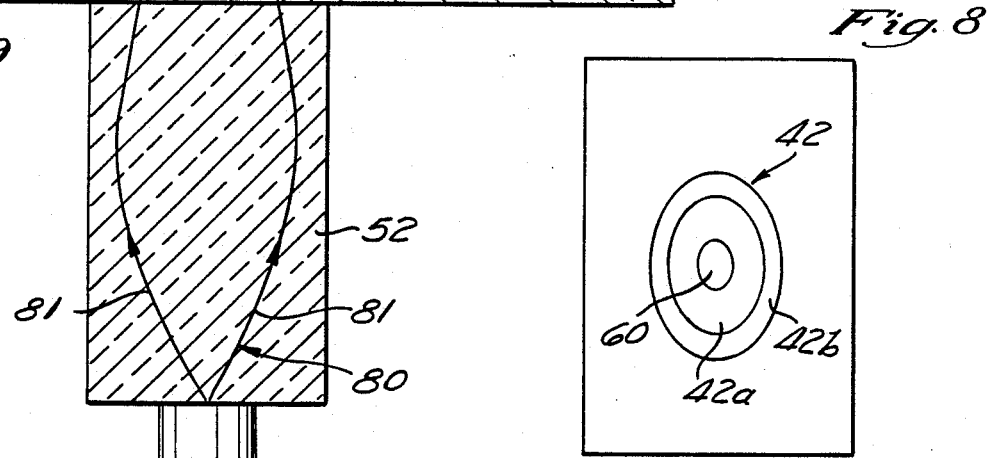
FIG. 8 is a partial cross sectional view of the coupler of the present invention, taken along the lines 8—8 of FIG. 7, showing a small mirror disposed at the center of the multi-mode bus fiber.

Having briefly discussed some of the basic principles of mode theory, the present invention will now be described. As shown in FIGS. 7 and 8, the coupler 40 of the present invention comprises a multimode fiber 42 having an inner core 42a and an outer cladding 42b. This multimode fiber 42 serves as an optical signal "bus" for the coupler 40. The coupler 40 also includes an input branch fiber 44, which is preferably a single mode fiber. The input fiber 44 carries optical signals from a device, such as a LAN transmitter or a sensor, for coupling to the fiber bus 42. Additionally, the coupler may include an output branch fiber 46, which may be either single mode fiber or multimode mode fiber. However, in the preferred embodiment, the output fiber 46 is a single mode fiber. The output fiber 46 carries optical signals from the fiber bus 42 to a device, such as a LAN receiver. In many sensor systems, however, the output fiber 46 is not needed.

In the embodiment disclosed, the central longitudinal axes of the input and output fibers 44, 46 lie along a common line 48. Additionally, the fibers 44, 46 are disposed such that the common axis 48 intersects the central longitudinal axis 49 of the multimode fiber 42 in direction normal thereto. For stability and rigidity, the multimode fiber 42 is preferably mounted in support structure, such as a quartz block 50. As illustrated, the block 50 has a rectangular cross section. The fiber 42 extends through a central bore in the block 50, which is disposed along the longitudinal axis of the block 50. The fiber 42 is bonded within this bore by means of an adhesive.

A lens 52, for example, a graded index lens, is disposed between the output end of the input fiber 44 and one of the side faces 54 of the block 50. Preferably, the graded index lens 52 is affixed to the block face 54 and input fiber 44 by means of an adhesive. Similarly, a graded index lens 56 is disposed between the input end of the output fiber 46 and a side face 58 of the block, which is opposite the side face 54. The lens 56 is similarly bonded to the block face 58 and fiber 46 by means of an adhesive.

As shown in FIG. 8, a small reflector 60 is disposed within the core of the multimode optical fiber 42 at the juncture between the common axis 48 of the fibers 44, 46 and the longitudinal axis 49 of the multimode fiber 42. In the preferred embodiments, the reflector 60 is a plane mirror which is shaped as a disk, although it will be understood that other types of mirror surfaces may be used. The planar surface of the mirror 60 is disposed at 45 degrees relative to the central axis of the fiber 42. The mirror 60 is oriented to receive light propagating through the multimode fiber 42 in the direction indicated by the arrow 64 and to reflect such light towards the lens 56 and output fiber 46 for propagation through the output fiber 46 in the direction indicated by the arrow 66. In this orientation, the mirror will also be positioned to receive light propagating through the input fiber 44 in the direction indicated by the arrow 68, and to reflect such light for propagation through the multimode fiber 42 in the direction indicated by the arrow 64.

The coupler 40 is a nonreciprocal device. That is, the fraction of optical power coupled is significantly different depending upon whether the light is being coupled to the multimode fiber 42 or from the multimode fiber 42. A relatively high fraction of the light propagating through the input fiber 44 in the direction 68 will be coupled to the multimode fiber 42. However, a relatively low fraction of the light propagating in the multimode fiber 42 in the direction 64 will be coupled to the output fiber 46 for propagation in the direction 66. The nonreciprocal coupling of the coupler 40 may be more fully understood through reference to FIGS. 9-11.

Figure 10:
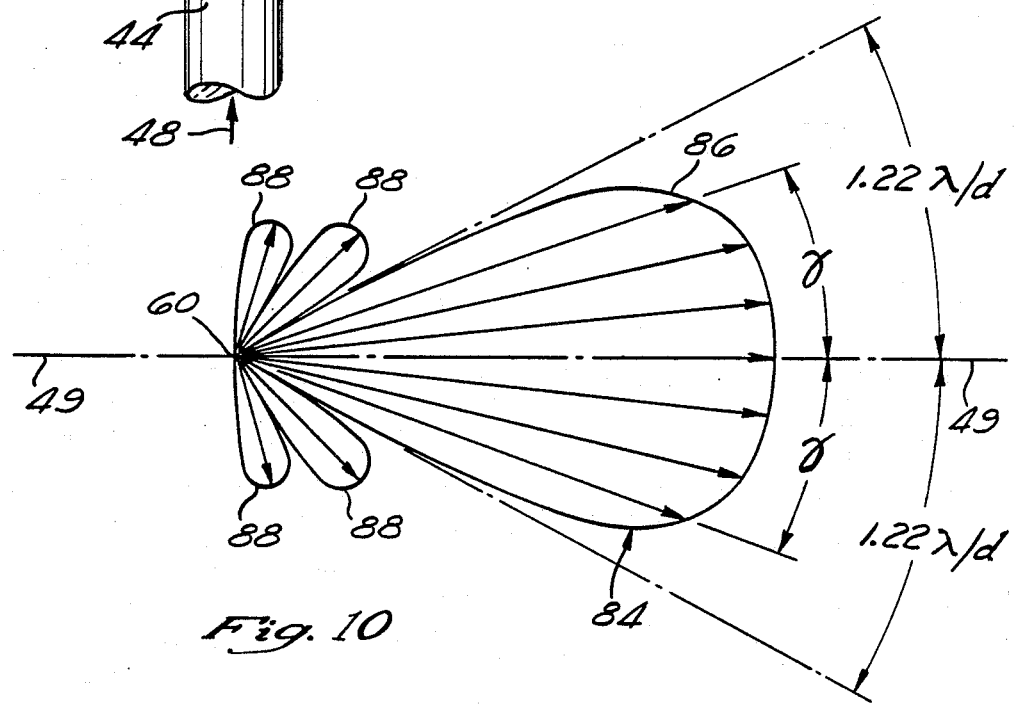
FIG. 10 is a drawing of an exemplary Airy diffraction pattern, showing the far field intensity distribution of the light reflected from the mirror.

FIG. 9 is a partial cross-sectional view which illustrates optical coupling from the single mode input fiber 44 to the multimode mode fiber 42. Light propagating through the input fiber 44 in the direction 48 enters the graded index lens 52 as a cone shaped beam 80, represented by the rays 81. The beam 80 is focused by the graded index lens 52 such that the rays 81 converge to a diameter approximately equal to the diameter of the planar surface of the mirror 60. Since the surface of the mirror 60 is inclined at an angle of 45 degrees relative to the central axis 49 of the fiber 42, the mirror 60 will reflect the light beam 80 for propagation down the fiber 42 in the direction 64. The mirror 60 is very small, and in the preferred embodiment, the mirror is sized to intercept only that portion of the optical energy of the beam 80 which is within the peak of the energy distribution associated with the single mode fiber 44. This portion of the optical energy is represented by the dimension $E_p$ in FIG. 3. Because the mirror is small, the light 80 incident thereon will be reflected as a cone shaped beam 82, represented by the rays 83. In this regard, it will be understood that the mirror 60 functions in a matter analogous to a small aperture (e.g., a pinhole), such that the reflected light 82 diverges in the same manner as light passing through a pinhole will diverge due to diffraction. The Airy diffraction pattern for the mirror 60 is illustrated schematically in FIG. 10 as the pattern 84. The clarity of illustration, only the mirror location and the central axis 49 of the fiber 42 are depicted. The arrows radiating from the mirror 60 to the boundaries of the pattern 84 represent the direction of propagation of various exemplary light rays within the reflected light beam 82. The length of each arrow represents the optical intensity associated with the particular direction of propagation. Thus, the diffraction pattern 84 indicates the intensity of the reflected light beam 82 as a function of the direction of propagation of the light radiating from the mirror surface. As shown in FIG. 10, the intensity of the reflected light 82 is highest for the light ray which propagates along the central axis 49. Those rays which propagate at an angle from the axis 49 decrease in intensity as the angle increases. As illustrated, the reflected light 82 is concentrated principally in an area defined by a central lobe 86 which extends along the longitudinal axis 49. In addition, there are several side lobes 88 which extend in a generally lateral direction from the axis 49. The first zero of the diffraction pattern 84 (i.e. the juncture between the central lobe 86 and the next adjacent side lobe 88) occurs at an angle of $1.22\lambda/d$ from the longitudinal axis 49. Thus, the central lobe 84 represents a cone shaped beam of light which diverges from the fiber axis 49 at an angle of $1.22\lambda/d$, where d is the diameter of the mirror 60 and $\lambda$ is the wavelength of the light. The diffraction pattern 84 indicates that this cone shaped beam of light represented by the central lobe 86 has an intensity which is relatively constant at locations near the fiber axis 49, i.e., within an angle $\gamma$ from the axis 49. However, the intensity rapidly drops towards zero as the angle $1.22\lambda/d$ is approached.

Those skilled in the art will recognize that only the portion of the reflected light beam 82 which is within the "acceptance cone" of the fiber 42 will be guided by the fiber 42. As is well known, the "acceptance cone" is defined by the "total reflection complementary angle" ($\theta_c$). Light rays within the acceptance cone (i.e., those rays inclined from the central axis 49 by an angle less than $\theta_c$) will be guided by the fiber. Light rays outside the acceptance cone (i.e., those rays inclined from the central axis 49 by an angle greater than $\theta_c$) will not be guided by the fiber.

In the present invention, it is preferable that the reflected light 82 be distributed over all of the mode groups of the fiber 42. This can readily be accomplished by insuring that the acceptance cone of the fiber is smaller than the cone of light represented by the central lobe 86 of the pattern 84. Stated another way, the total reflection complementary angle ($\theta_c$), discussed in reference to FIG. 6, should be no greater than the angle $1.22\lambda/d$, such that the zeros between the lobes 86, 88 are not subtended by the angle $1.22\lambda/d$. Thus:

$$\theta_c \leq 1.22\lambda/d \tag{5}$$

The above relationship may be satisfied by properly selecting the mirror diameter (d), wavelength ($\lambda$), and fiber parameters ($n_1$, $n_2$). Note that the angle at which the first zero occurs varies inversely with the mirror diameter, and thus, fibers having high total reflection complementary angles ($\theta_c$) may be accommodated by decreasing the mirror diameter (d).

Although satisfying the relationship of equation 5 insures that the reflected light 82 (FIG. 9) will be introduced into all of the mode groups of the fiber 42, it is also preferable to distribute the light among the mode groups in direct proportion to the number of modes in each mode group. Since coupling between modes within a mode group occurs readily over a short distance, such distribution results in equalizing the intensity among all of the fiber modes. This distribution of optical power may be accomplished by insuring that the "total reflection complementary angle" ($\theta_c$) is no greater than the angle $\gamma$, referred to herein as the "constant intensity cone angle". As shown in FIG. 10, the angle $\gamma$ is that angle, measured from the longitudinal axis 49, through which the intensity of the central lobe 86 is substantially constant. Stated another way, the angle $\gamma$ is the angle between the central axis 49 and a point on the central lobe 86 at which the optical intensity begins to fall rapidly towards zero. Thus, the angle $\gamma$ subtends a cone shaped beam of relatively uniform intensity, which is referred to herein as the "constant intensity beam portion". By insuring that the acceptance cone is no greater than the constant intensity beam portion, each of the mode groups will receive light in proportion to the number of modes in the group so that the modes will be equalized with respect to intensity. The foregoing may be expressed mathematically by the following relationship:

$$\theta_c \leq \gamma \quad (6)$$

It should be noted that, if the mirror 60 is located at the center of the fiber (i.e. at the axis 49), such as in the preferred embodiment, only the meridional rays within each mode group will be excited. However, as mentioned above, a redistribution of power between the meridional rays and the skew rays occurs within each mode group after a short propagation distance through the fiber 42, thereby causing the optical power to be equalized among all modes within a mode group.

It is also possible to improve the power distribution among modes within a mode group by locating the mirror in an off-axis position. This cause more skew rays to be excited, yielding a more even distribution of mode power.

Although the preferred embodiment utilizes step index fiber, the present invention may also be implemented utilizing a graded index fiber. However, in such case, it is preferable to locate the mirror at the fiber axis, since off-axis excitation will result in increased radiation losses, due to the fact that the local "total reflection complementary angle" ($\theta_c$) in a graded index fiber is lower in an off axis position.

From the foregoing, it will be seen that the coupler 40 of the present invention is capable of coupling substantially all of the light from the input fiber 44 to the multimode bus fiber 42. Further, if the mirror size, wavelength, and fiber parameters are selected properly, the coupler 40 distributes the coupled light substantially evenly over all of the modes of the fiber 42.

Figure 11:
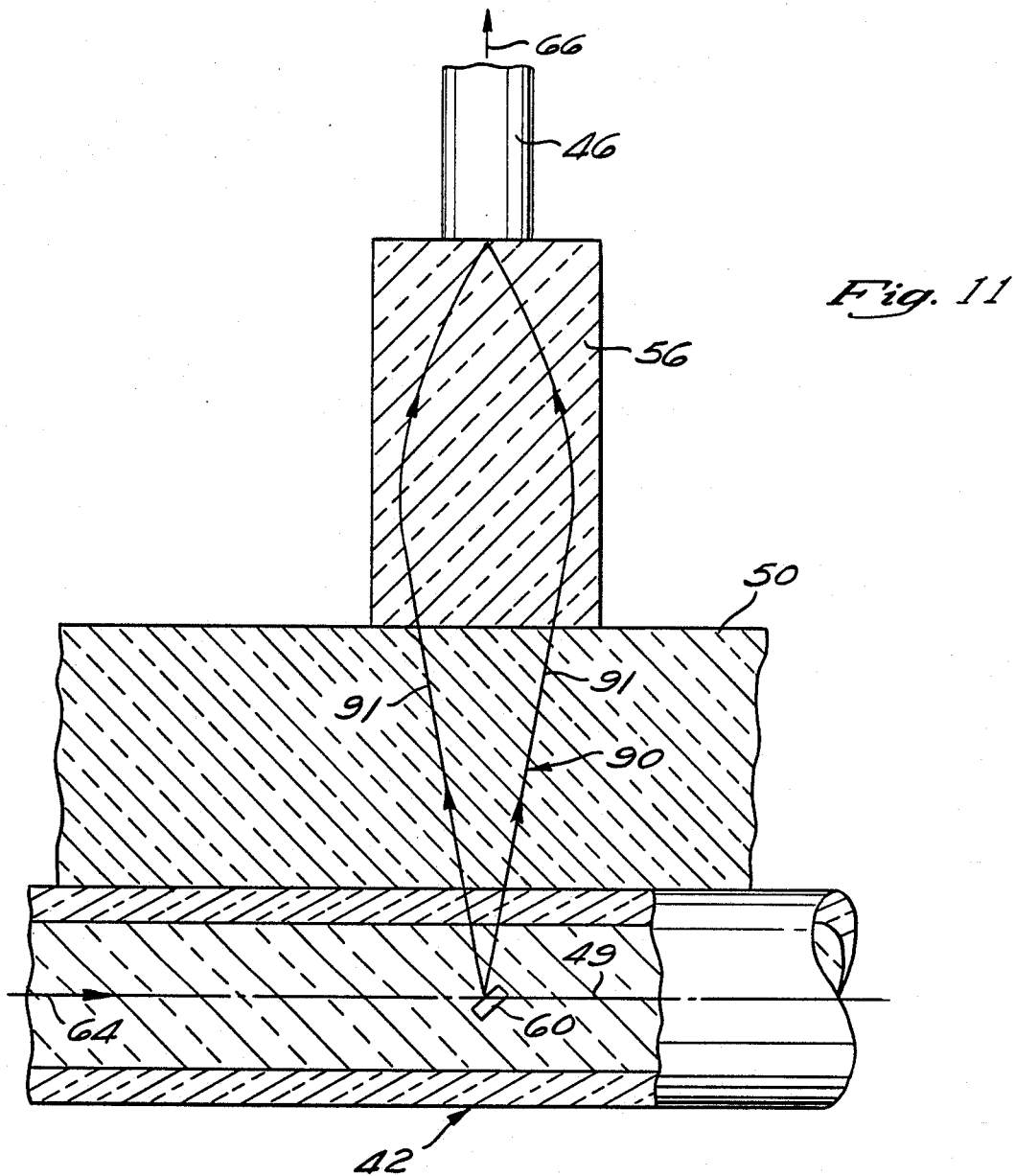
FIG. 11 is a partial cross-sectional view of the coupler of FIG. 7, illustrating the function of the mirror in coupling light from the multi-mode bus fiber to the output branch fiber.

FIG. 11 is a partial cross-sectional view which illustrates optical coupling from the multimode fiber 42 to the output fiber 46. Light propagates through the multimode fiber 42 in the direction 64 towards the mirror 60. Since the mirror 60 is very small compared to the core diameter, only a small fraction of the optical power in the fiber 42 will be incident on the mirror 60. Note that the light propagating in the direction 64 is incident on the side of the mirror 60 which is opposite the side upon which the light beam 80 (FIG. 9) is incident. Thus, in the embodiment disclosed, both sides of the disk shaped mirror have reflective surfaces. The portion of light propagating in the multimode fiber 42 which is incident on the mirror 60 is reflected therefrom in the form of a cone-shaped beam 90, represented by the rays 91. The cone-shaped beam 90 propagates in a direction substantially normal to the fiber axis, and thus, it will radiate through the cladding without being internally reflected. After propagating through the cladding, the beam 90 propagates through the block 50 to the graded index lens 56. This lens 56 focuses the diverging cone-shaped beam of light 90 for input to the input end of the output fiber 46. The light 90 then propagates through the output fiber 46 in the direction 66.

As previously mentioned, the mirror 60 is extremely small, and thus, the fraction of light coupled from the multimode fiber 42 to the single mode fiber 46 by the mirror 60 will be small compared to the fraction of light in the multimode fiber 42 which is not coupled (i.e., the fraction which is not incident on the mirror). In optical systems having a number (n) of the couplers 40 at spaced intervals along the multimode fiber bus 42 (such as LANs and sensor networks), the size of the mirror 60 may be optimized for maximum throughput of the optical power coupled to the fiber bus 42. As discussed in more detail hereinafter, the optimized mirror diameter (d) for the preferred embodiment may be expressed as:

$$d = \frac{2a}{\sqrt{n-1}} \quad (7)$$

Figure 12:
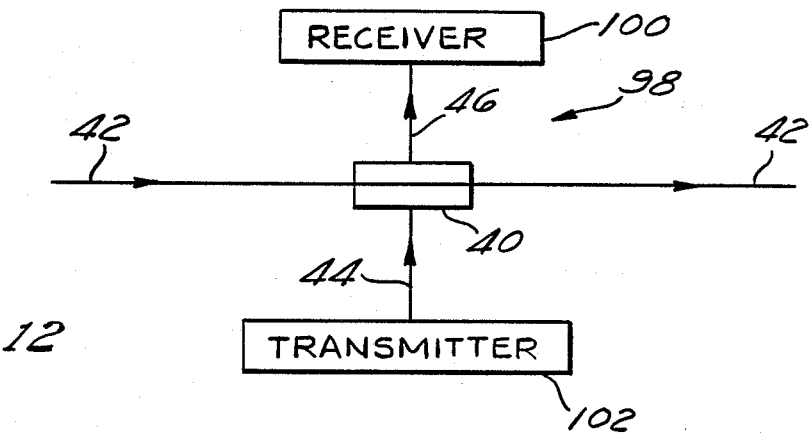
FIG. 12 is a schematic drawing illustrating use of the coupler of the present invention in one of plural work stations in a fiber optic local area network.

As shown in FIG. 12, the coupler 40 of the present invention may be adapted for use in a fiber optic local area network to provide optical communication between the LAN bus and transmitter/receiver stations located along the bus. An exemplary LAN station 98 comprising a receiver 100 and transmitter 102 is illustrated in FIG. 12. The multimode fiber 42 of the coupler 40 serves as the data bus for the local area network. The fiber bus 42 is coupled to the optical data receiver 100 through the output fiber 46 of the coupler 40, while the optical data transmitter 102 is coupled to the fiber bus 42 through the input fiber 44 of the coupler 40. The coupler 40 thus optically couples signals propagating on the bus 42 to the receiver 100. Similarly, the coupler 40 couples signals generated by the transmitter 102 to the data bus 42. The fraction of light coupled from the transmitter 102 to the bus 42 is large compared to the fraction of light coupled from the bus 42 to the receiver 100, and thus, the coupler 40 functions as a non-reciprocal coupling device. Because only a very low fraction of optical power is coupled to the receiver 100, a large number of LAN stations 98 may be arranged in optical communication along the fiber bus 42.

Figure 13:
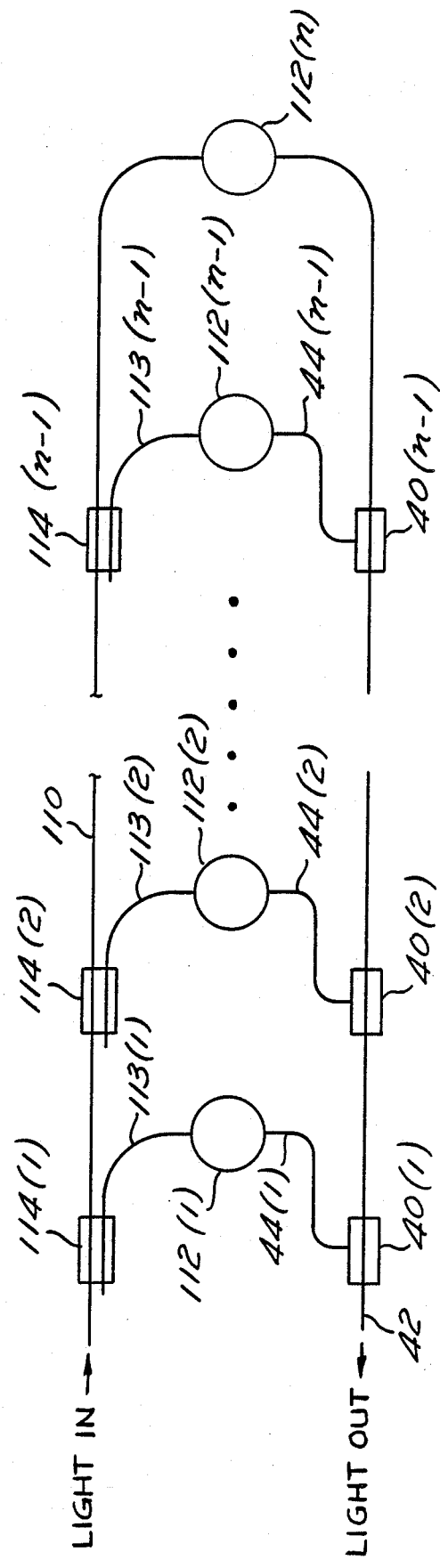
FIG. 13 is a schematic drawing illustrating the use of the coupler of the present invention in an exemplary sensor system.

Another preferred use for the coupler 40 of the present invention is to multiplex the signals of a sensor system onto a common return bus. FIG. 13 illustrates a ladder-type sensor system in which the coupler 40 may be used to particular advantage. This type sensor system is described in an article by A. R. Nelson and D. H.

McMahon entitled "Passive Multiplexing Techniques for Fiber Optic Sensor Systems", *International Fiber Optical Communications Journal,* Vol. 2, p. 27-30 (March, 1981).

As illustrated in FIG. 13, this sensor system includes a single mode fiber optic input bus 110, for receiving an input optical signal. The multimode optical fiber 42 of the present invention serves as an output bus. A series of sensors 112(1) to 112(n−1) are optically connected to receive light from the input fiber bus 110 through a series of single mode, input branch fibers 113(1) to 113(n−1), respectively. These branch fibers 113(1) to 113(n−1) are coupled to the input bus 110 by respective fiber optic directional couplers 114(1) to 114(n−1). A sensor 112(n) is optically connected to receive light directly from the end of the input fiber bus 110.

The sensors 112(1) to 112(n−1) are optically connected to output light therefrom to respective branch fibers 44(1) to 44(n−1), respectively. These branch fibers 44(1) to 44(n−1) are connected to input light to fiber optic directional couplers 40(1) to 40(n−1), respectively, which are spaced along the output fiber bus 42. The sensor 112(n) is connected to output light therefrom directly to the end of the output fiber bus 42.

The couplers 114 are constructed by juxtaposing the branch fibers 113 with the input bus 110, such that the fibers 113 are in side by side relationship with the fiber 110 for evanescent coupling therebetween. Hereinafter, the couplers 114 will be referred to as "lateral couplers". Additional details as to the construction of such lateral couplers may be found in U.S. Pat. No. 4,493,528 entitled "Fiber Optic Directional Coupler".

The couplers 40, on the other hand, are constructed in accordance with the present invention, and are identical to the coupler 40 of FIG. 7, except that the output fiber 46 and associated lens 56 have been removed. The branch fibers 44 of FIG. 13 correspond to the input fiber 44 of FIG. 7.

The input light propagating through the input fiber bus 110 is distributed to each of the sensors 112 by means of the couplers 114. The light emerging from the sensors 112 then propagates through the branch fibers 44 to the couplers 40, where this light is coupled to the output bus 42. Use of the couplers 40 of the present invention in this arrangement is highly advantageous, since it permits substantially all of the light from sensors 112 to be coupled to the output bus 42. Those skilled in the art will understand that if lateral couplers, such as the couplers 114 were utilized along the output bus, a significant amount of optical power would be lost through the "dead end" terminals of the lateral couplers.

Although the above-described sensor system utilizes two different types of couplers, it will be understood that such a sensor system could be implemented utilizing exclusively the couplers of the present invention. In such case, both the input and output fiber buses would be multimode fibers, while the branch fibers would be single mode fibers.

The sensor system of FIG. 13 has been analyzed in detail. From this analysis, it has been found that, by selecting the number of modes of the multimode fiber 42 as a function of the number of sensors 112, the transmission for light output from the sensors 112 through the fiber bus 42 can be made substantially independent of the number of sensors.

In the analysis, it was assumed that the multimode bus fiber was a step index fiber with a radius (a) and a numerical aperture NA. It was further assumed that the mirror 60 was located at the fiber axis 49, and that the spot size of the focused light from the single mode input fiber 44 was large compared to the mirror diameter (d), so that the illumination of the mirror 60 was essentially constant. As previously mentioned, the Airy diffraction pattern of the light reflected from the mirror has its first zero at an angle of 1.22λ/d. It was assumed that the numerical aperture of the multimode fiber 42 was small compared to this angle, and therefore, that the radiance was approximately constant within the acceptance cone of the fiber 42, such that the mode groups were excited in proportion to the number of modes within each group. This condition may be expressed as follows:

$$1.22\lambda/d >> NA \tag{8}$$

Further, it is well-known that:

$$k = 2\pi/\lambda \tag{9}$$

Thus:

$$1.22 >> dkNA/2\pi \tag{10}$$

Equation 9 may be rewritten as:

$$1.22\pi >> dkaNA/2a \tag{11}$$

Further, it is well-known that:

$$V = kaNA \tag{12}$$

Therefore, $$4 >> V(d/2a) \tag{13}$$

The number of modes in a multimode fiber is related to the V-number by:

$$M = V^2/2 \tag{14}$$

Thus:

$$4 >> (d/2a)\sqrt{2M} \tag{15}$$

The formula for diffracted intensity for a circular aperture (in this case the mirror 60) shows that the fraction of power transmitted from the single mode fiber to the multimode fiber is:

$$T_{sm} = R\left(\frac{kdNA}{4}\right)^2 = \frac{R}{2}\left(\frac{d}{2a}\right)^2 M \tag{16}$$

where R is a constant representing the fraction of incident power actually intercepted and reflected by the mirror 60.

The amount of power coupled out of the multimode fiber 42 due to the presence of the mirror 60 is determined by the area of the mirror 60 compared to the area of the core of the multimode fiber 42, provided that the power is evenly distributed among all modes. Therefore, the fraction of the optical power transmitted through the multimode fiber 42 (i.e., the power throughput from one side of the mirror 60 to the other) is:

$$T_{mm} = 1 - \left(\frac{d}{2a}\right)^2 \quad (17)$$

In a ladder structure of n sensors such as shown in FIG. 13, the next to last sensor (i.e., sensor number n−1) will have the lowest transmission, since the light from this sensor must be coupled through n−2 of the couplers 40 (FIG. 13). The fraction of power transmitted from the sensor n−1 will be:

$$T_{n-1} = T_{sm} T_{mm}^{n-2} = \frac{R}{2}\left(\frac{d}{2a}\right)^2 M\left[1 - \left(\frac{d}{2a}\right)^2\right]^{n-2} \quad (18)$$

By maximizing Equation 18 with respect to d/2a, it may be found that maximum transmission from the sensor number n−1 is achieved when the mirror diameter (d) is related to the fiber radius (a) by:

$$\left(\frac{d}{2a}\right)^2 = \frac{1}{n-1} \quad (19)$$

Substituting Equation 19 into Equation 16, it may be found that:

$$T_{sm} = \frac{R}{2} \frac{M}{n-1} \quad (20)$$

Substituting Equation 19 into Equation 17 yields:

$$T_{mm} = 1 - \frac{1}{n-1} \quad (21)$$

Finally, substituting Equations 20 and 21 into Equation 18, it may be found that the transmission from the sensor number n−1 is related to the total number of sensors (n) and the number of fiber modes (M) by:

$$T_{n-1} = \frac{R}{2} \frac{M}{n-1}\left(1 - \frac{1}{n-1}\right)^{n-2} \quad (22)$$

As the number of sensors (n) becomes large, expression 22 approaches:

$$T_{n-1} \rightarrow \frac{R}{2e} \frac{M}{n} \quad (23)$$

Since expression 23, by definition, cannot be greater than unity, this expression is subject to a restriction on the variable M. From inequality 13 in combination with expression 19, it may be found that expression 23 is valid only when the following restriction is placed on the number of modes (M):

$$(M/n) < < 8 \quad (24)$$

Expression 23 clearly indicates that as the number (n) of sensors increases, the transmission from the sensor number n−1 can be maintained at a constant value merely by increasing the number of fiber modes (M) such that the ratio M/n is constant. This suggests that, by utilizing the coupler 40 of the present invention, the fraction of light propagating from sensor number n−1 to the output end of the fiber bus 42 can be made independent of the number of sensors. In practice, however, requirements on the dispersion of the fiber may set an upper limit to the number of modes.

A similar analysis may be carried out for transmitter/receiver stations on the bus of a local area network. However, the results of the analysis will be substantially the same. Further, it should be noted that Equation 19, which defines a preferred relationship among the mirror diameter, core radius, and number of modes is appropriate for use in local area networks, as well as sensor systems.

In the analysis presented above, it was assumed that the spot size of the focused light from the single mode input fiber 44 was large compared to the mirror diameter (d) and that the acceptance angle of the multimode fiber was small compared to the angular extent of the main lobe of the diffraction pattern of the light reflected from the mirror. These assumptions were made in order to ensure an even distribution of light power during the modes of the multimode fiber. However, it will be understood that the same assumptions result in coupling losses from the input fiber to the multimode fiber bus. In practice, a compromise may be chosen in which coupling losses would be reduced at the expense of a somewhat uneven distribution of power among the modes. The compromise could be achieved utilizing empirical methods or through theoretical analysis.

In the preferred method of manufacture of the present invention, the multimode bus fiber is first inserted in the bore of the quartz block 50, and cemented therein by means of a suitable adhesive, as mentioned above. The block 50 is then cut at an angle of 45° relative to the fiber axis 49 to form end faces 120, 122 (FIG. 7). The end faces 120, 122 are polished, and a small metallic or dielectric mirror is deposited in the central part of the core, using conventional evaporation and photolithographic techniques. The end faces 120, 122 of the two block halves are then bonded together after being adjusted to minimize loss through the fiber splice. The lenses 52, 56 and single mode fibers 44, 46 are then mounted on the block 50, as previously discussed.

An alternative way of forming the mirror is to introduce a reflecting object, such as a metallic sphere, during the fiber manufacturing process. For example, if an inside chemical vapor deposition process is used, several metal spheres can be introduced in the preform before it is collapsed. After drawing the fiber, the regions containing the spheres can be identified and the fiber cut at appropriate lengths. These pieces of fiber may then be mounted in mounting structures, such as quartz blocks. This manufacturing process is advantageous in that the fiber does not have to be cut and the mirror deposition process is eliminated. Although a spherical surface would not provide as efficient a reflector as the plane mirror, this technique may nevertheless have application where coupling losses can be tolerated.

What is claimed is:

1. A fiber optic coupler, comprising:
   a first optical fiber;
   a second multimode optical fiber, said multimode fiber including plural mode groups; and
   a reflector, substantially smaller than the core of said multimode optical fiber, said reflector disposed within the core of said multimode optical fiber and positioned to receive light from said first optical fiber and reflect the light for propagation in said second multimode optical fiber, said multimode fiber having a total reflection complementary angle, said reflector and said total reflection complementary angle of said multimode fiber being relatively sized to cause substantially all of said plural mode groups to be excited with said reflected light, said reflected light being distributed among said plural mode groups of said multimode fiber substantially in proportion to the number of modes in each of said mode groups.

2. A fiber optic coupler, as defined by claim 1, wherein said first optical fiber is a single mode optical fiber which propagates light in a generally Gaussian shaped energy distribution and wherein said reflector is sized to receive only that portion of light propagating in said first fiber which is within the peak of said energy distribution such that said reflector is substantially uniformly illuminated.

3. A fiber optic coupler, comprising:
a first optical fiber;
a second multimode optical fiber, said multimode fiber including plural mode groups; and
a reflector, substantially smaller than the core of said multimode optical fiber, said reflector being substantially disk-shaped, and having reflective surfaces on both sides thereof, said disk-shaped reflector disposed within the core of said multimode optical fiber and positioned to receive light from said first optical fiber and reflect the light for propagation in said second multimode optical fiber, said multimode fiber having a total reflection complementary angle, said disk-shaped reflector and said total reflection complementary angle of said multimode fiber being relatively sized to cause substantially all of said plural mode groups to be excited with the reflected light.

4. A fiber optic coupler, comprising:
a first optical fiber;
a second optical fiber, said second fiber being multimode and having plural mode groups; and
means for coupling optical power from said first fiber to said second fiber, said coupling means distributing said optical power among substantially all of said plural mode groups, substantially in proportion to the number of modes in each of said mode groups.

5. A fiber optic coupling system, comprising:
a multimode bus fiber;
plural reflectors disposed within the core of said multimode bus fiber at locations which are spaced at intervals along said fiber; and
a series of branch fibers, each disposed at one of said spaced interval locations, said reflectors positioned to receive light from said branch fibers, respectively, and reflect said light for propagation is said multimode fiber to provide optical communication between said bus fiber and said branch fibers at said locations, the diameter of said reflectors selected in accordance with the radius of the core of said multimode fiber and the total number of reflectors within said core to maximize the transmission of optical power from the first of said series of branch fibers to the output of said bus fiber.

6. A fiber optic data coupling system, as defined by claim 5, wherein said branch fibers are optically connected to respective sensors.

7. A fiber optic coupling system, comprising:
a multimode bus fiber;
plural reflectors disposed within the core of said multimode bus fiber at locations which are spaced at intervals along said fiber; and
a series of branch fibers, each disposed at one of said spaced interval locations, said reflectors positioned to receive light from said branch fibers, respectively, and reflect said light for propagation in said multimode fiber to provide optical communication between said bus fiber and said branch fibers at said locations, the diameter of said reflectors selected in accordance with the radius (a) of the core of said multimode fiber and the total number of reflectors $(n-1)$ within said core to maximize the transmission of optical power from the first of said series of branch fibers to the output of said bus fiber, said diameter (d) of said reflectors being approximately equal to:

$$d = \frac{2a}{\sqrt{n-1}}$$

8. A fiber optic coupling system, comprising:
a multimode bus fiber;
plural reflectors disposed within the core of said multimode bus fiber at locations which are spaced at intervals along said fiber;
a first series of branch fibers, each disposed at one of said spaced interval locations, said reflectors positioned to receive light from said first series of branch fibers, respectively, said reflectors including respective surfaces for reflecting said light from said first series of branch fibers for propagation in said multimode fiber to provide optical communication between said bus fiber and said first series of branch fibers at said locations, the diameter of said reflectors selected in accordance with the radius of the core of said multimode fiber and the total number of reflectors within said core to maximize the transmission of optical power from the first of said series of branch fibers to the output of said bus fiber; and
a second series of branch fibers, each disposed at one of said locations, said reflectors further including respective surfaces for reflecting light from said multimode fiber to said second branch fibers, respectively.

9. A method of manufacturing a fiber optic coupling system comprising the steps of:
providing a multimode bus fiber having plural reflectors within the core of said bus fiber at locations which are spaced at intervals along said fiber; positioning a sereis of branch fibers, each disposed at one of said locations, such that said reflectors receive light from said branch fibers, respectively, and reflect said light for propagation in said multimode fiber to provide optical communication between said branch fibers and said bus fiber at said locations; and
sizing the diameter of said reflectors as a function of the core radius of said multimode fiber and the total number of reflectors within said core to maximize the transmission of optical power from the first of said series of branch fibers to the output of said bus fiber.

* * * * *